United States Patent Office 3,231,583
Patented Jan. 25, 1966

3,231,583
PROCESS FOR THE HALOGENATION OF
PHTHALOCYANINES
Walter Frey, Muttenz, Basel-Land, Switzerland, assignor to Sandoz Ltd., Basel, Switzerland
No Drawing. Filed Feb. 7, 1963, Ser. No. 256,827
Claims priority, application Switzerland, Feb. 23, 1962, 2,225/62; Feb. 26, 1962, 2,364/62; Jan. 11, 1963, 356/63, 357/63
6 Claims. (Cl. 260—314.5)

The halogenation of phthalocyanines in a medium which is indifferent at the reaction temperature is known. For this purpose the phthalocyanine is usually suspended in a melt of aluminum chloride and sodium chloride, in which it is for the greater part dissolved, and submitted to the action of chlorine until such time as the desired degree of chlorination is obtained. On cooling, the reaction product is treated with a dilute aqueous acid. This causes hydrolysis of the aluminum chloride which consequently cannot be recovered and used for further reactions. Another disadvantage of the method is that in the chlorination of copper phthalocyanine up to 50% of the copper is replaced by aluminum. Attempts have been made to reduce the amount of copper exchanged for aluminum by including copper chloride in the reaction mixture, but even when fairly large amounts of copper chloride are used, 20% or more of the bound copper is replaced by aluminum. This exchange is a very great disadvantage since aluminum phthalocyanines are less fast to light than copper phthalocyanines.

The use of reaction media other than aluminum chloride is also known. Both organic compounds, e.g. nitrobenzene, benzoyl chloride or phthalyl chloride, and inorganic compounds, e.g. sulfuric acid or chlorosulfonic acid, have been proposed. The organic compounds have the disadvantage of not being completely indifferent to halogens. Sulfuric acid and chlorosulfonic acid attack phthalocyanines. Moreover, these materials make it difficult to work up the reaction products, and in view of this chlorination in industrial practice is invariably effected in a melt of aluminum chloride and sodium chloride.

It has now been found that great advantages are gained when the reaction medium used for the halogenation of phthalocyanines is a halide of a metal or of a semimetal belonging to the fourth group in the periodic system of the elements, the said halide being liquid at the reaction temperature and distillable. The tetrachlorides of the elements in this group, notably titanium tetrachloride, are especially suitable. This tetrachloride is entirely indifferent to halogens and at the same time it does not attack phthalocyanines. On completion of the reaction it can be almost completely recovered by distillation and used for further halogenizing reactions. As the copper in copper phthalocyanines is not replaced by titanium, the resulting halogenated copper phthalocyanines are homogeneous and fast to light. Similarly good results are obtained, for example, with tin tetrachloride and with silicon tetrachloride.

Halogenation is generally carried out at temperatures between about 120° C. and 250° C. and at superatmospheric pressure, preferably at a pressure of at least 2 atmospheres, for example at about 2 to 40 atmospheres pressure. The halogens, of which chlorine and bromine are of primary interest, may be added in the liquid or gaseous state. Mixtures of bromine and chlorine also can be used with very good results. However, it is more advantageous to allow the bromine to react first and then the chlorine, when a bromine- and chlorine-containing phthalocyanine is to be produced. Another method of addition is to use a bromine salt which upon the subsequent introduction of chlorine disengages bromine. The amounts of halogen employed are determined by the desired degree of halogenation. Preferably, 1 to about 16 chlorine or bromine atoms are introduced into 1 molecule of the phthalocyanine.

The amount of the halide used as reaction medium may vary within wide limits. The one important consideration is that the reaction mixture should be easily stirrable. This is best achieved by using at least 3 parts by weight and about 3 to 40 parts by weight of a halide of a metal or of a semimetal of the fourth group to 1 part by weight of the phthalocyanine. The phthalocyanine used may be the metal-free parent compound, or, e.g. copper, iron, nickel, tin, titanium or cobalt phthalocyanine.

When the reaction is completed the compound used as reaction medium can be distilled at superatmospheric pressure, or, after previous cooling to its boiling point, at atmospheric or at reduced pressure. The halogenated phthalocyanine is obtained as a dry, fine-grained powder. It contains less then 1% titanium. It can be purified and brought into a finer state of division by pasting with sulfuric acid containing sulfur trioxide and precipitation by the addition of water.

It is another object of this invention to perform reactions of the above type at a temperature higher than the normal boiling point of the reaction medium, preferably from 120° to 250° C., and at a higher pressure than the vapor pressure of the reaction medium at the reaction temperature, preferably from 2 to 40 atmospheres, by introducing continuously the halogen into the reaction vessel. In this way the reaction medium can be used for several successive reactions performed within a relatively wide temperature range. The process can be carried out using, for example, the following apparatus:

A reaction vessel is equipped with a reflux condenser, at the upper end of which an external pressure valve is fitted. The function of the valve is to equalize the pressure in the vessel when it exceeds the maximum. The gases which are evolved during most reactions of the aforementioned nature can be easily and continuously eliminated from the apparatus with the aid of an automatic pressure valve. For example, a contact manometer can be fitted at the upper end of the reflux condenser to register the pressure prevailing in the vessel. The manometer is controlled by a magnetic valve, which in turn regulates the air supply to a pneumatic valve through which the reaction gases can escape.

The parts and percentages given in the examples are by weight and the temperatures are in degrees centigrade.

*Example 1*

4000 parts of titanium tetrachloride, 200 parts of copper phthalocyanine and 400 parts of bromine are heated in an enamelled autoclave for 12 hours at 165° with stirring. The pressure is 15 atmospheres. The mass is allowed to cool and the titanium tetrachloride distilled off. 345 parts of a bluish-green brominated copper phthalocyanine of 42% bromine content is obtained. For purification it can be dissolved in a mixture of 100 parts of sulfuric acid monohydrate and 50 parts of 25% oleum at 60° and precipitated with water.

*Example 2*

In an enamelled autoclave with stirrer 1000 parts of silicon tetrachloride, 250 parts of copper phthalocyanine and 38 parts of chlorine are heated for 10 hours at 130°. The pressure is 15 atmospheres. After cooling to 40° and relieving the excess pressure, the silicon tetrachloride is distilled off. The product is 268 parts of copper monochlorophthalocyanine.

*Example 3*

4000 parts of titanium tetrachloride, 100 parts of metal-free phthalocyanine and 16 parts of chlorine are heated for 15 hours at 145°. A pressure of 3 atmospheres is developed. On cooling to 135° the titanium tetrachloride is distilled off. 106 parts of monochlorophthalocyanine is obtained.

*Example 4*

1000 parts of titanium tetrachloride and 80 parts of copper phthalocyanine are entered into an enamelled steel autoclave equipped with a reflux condenser, at the upper end of which is fitted a magnetic valve controlled by a contact pressure gauge. The autoclave is closed and at 8 atmospheres pressure 200 parts of liquid chlorine are entered. The contact manometer is then adjusted to 15 atmospheres and the mixture heated to 150° with constant stirring, at which temperature the reaction is initiated. Over the next 2 hours the temperature is increased to 170°. This temperature is maintained for a further 8 hours, after which heating is continued for a further 4 hours at 180°. The hydrogen chloride formed during the reaction escapes with a part of the excess chlorine through the magnetic valve. On completion of the reaction the mass is cooled to 130° and the titanium tetrachloride distilled off, first at normal pressure and finally in vacuum. The yield is 150 parts of a brilliant green copper chlorophthalocyanine with a chlorine content of 47% and a copper content of 5.85%.

*Example 5*

4000 parts of tin tetrachloride, 150 parts of tin phthalocyanine and 100 parts of bromine are entered into the autoclave referred to in Example 4. The contact manometer is adjusted to 15 atmospheres and the reaction mass heated at 170° for 5 hours. On cooling to room temperature 320 parts of liquid chlorine are entered. The mass is then heated at 160° for 2 hours and at 180° for a subsequent 14 hours. The hydrogen halide thus formed escapes through the magnetic valve. On cooling to 115° and relieving the pressure, the tin tetrachloride is distilled off and 240 parts of yellow-green tin polyhalogenophthalocyanine of 12% bromine and 33% chlorine content is obtained.

*Example 6*

In the autoclave referred to in Example 4, 4000 parts of titanium tetrachloride, 400 parts of copper phthalocyanine and 1600 parts of bromine are heated for 12 hours at 240°. The contact manometer is adjusted to 35 atmospheres pressure. On completion of the reaction the mass is cooled and the titanium tetrachloride distilled off. 1120 parts of brominated copper phthalocyanine of 64% bromine content is obtained.

*Example 7*

An enamelled pressure vessel fitted with a reflux condenser is used. The reflux condenser is fed with cold water and has at its upper end a pneumatic valve. The supply of air to this valve is controlled by a magnetic valve, which is itself controlled by a contact manometer which registers the reaction pressure. The contact manometer is set so that it actuates the magnetic valve when the pressure in the vessel is between 12 and 14 atmospheres.

In the pressure vessel of this apparatus 400 parts of copper phthalocyanine and 2000 parts of titanium tetrachloride are heated at 170°. Over 10 hours a stream of chlorine is injected at the rate of 60 parts per hour and at 6 atmospheres pressure, the reaction mass being constantly stirred. After this addition the temperature is increased to 190° and the pressure to 8 atmospheres, and in the course of 10 hours further chlorine is introduced at the rate of 40 parts per hour. The escaping reaction gases contain only small amounts of titanium tetrachloride.

On completion of the reaction the titanium tetrachloride is distilled off. The product is 720 parts of green copper chlorophthalocyanine containing 45.5% chlorine and 5.6% copper.

*Example 8*

In the apparatus used in Example 7, 400 parts of phthalocyanine and 2000 parts of stannous tetrachloride are heated at 170°. In 6 hours a jet of bromine is introduced at the rate of 10 parts per hour and at 11 atmospheres pressure, with constant stirring. Then the temperature is increased to 180° and the pressure to 15 atmospheres. Over the next 10 hours 60 parts of chlorine per hour are injected. The reaction gas thus evolved consists essentially of hydrogen bromide and hydrogen chloride with only small amounts of stannous tetrachloride. When the reaction has run its course the stannous tetrachloride is distilled off. 930 parts of yellow-brown bromochlorophthalocyanine of 27% bromine and 31% chlorine content is obtained.

*Example 9*

The apparatus used in Example 7 is charged with 80 parts of copper phthalocyanine, 1000 parts of silicon tetrachloride and 60 parts of bromine. It is closed and the contact manometer set at 30 atmospheres. The mass is heated for 8 hours at 160–170°, after which time a total of 160 parts of liquid chlorine is continuously injected over 12 hours, the same temperature being maintained throughout. The hydrogen halide thus formed together with a slight excess of chlorine escapes through the pneumatic valve. On completion of the reaction the mass is cooled to 60° and the silicon tetrachloride distilled off. 180 parts of a copper phthalocyanine containing 15% bromine and 37% chlorine is obtained.

*Example 10*

In the apparatus used in Example 7, 400 parts of iron phthalocyanine are suspended in 2000 parts of titanium tetrachloride. The suspension is heated at 160° and the apparatus adjusted to a pressure of 7 atmospheres. In the course of 4 hours 400 parts of liquid bromine are injected. Heating at 160° is continued for a further 4 hours. In the course of 12 hours 800 parts of liquid chlorine are introduced at 160–170°. The mass is cooled to 130° and the contents of the vessel are allowed to flow into a paddle drier, in which the titanium tetrachloride is distilled off, first at normal pressure and finally at reduced pressure. The product is 865 parts of a light green iron chlorobromophthalocyanine of 32.2% chlorine and 23% bromine content.

Having thus disclosed the invention what I claim is:

1. Process for the halogenation of phthalocyanine containing 0 to 1 metal atom, which comprises heating to a temperature between about 120° C. and 250° C. the phthalocyanine with at least one halogen with an atomic number between 17 and 35 in a member selected from the group consisting of titanium tetrachloride, silicon tetrachloride and tin tetrachloride as reaction medium, the ratio of said tetrachloride to said phthalocyanine being at least 3 to 1 by weight and the halogenation is conducted at a pressure of at least two atmospheres.

2. Process according to claim 1, wherein the phthalocyanine is metal-free phthalocyanine.

3. Process according to claim 1, wherein the phthalocyanine is copper phthalocyanine.

4. Process according to claim 1, wherein the phthalocyanine is tin phthalocyanine.

5. Process according to claim 1, wherein the phthalocyanine is iron phthalocyanine.

6. A process for the halogenation of phthalocyanine containing 0 to 1 metal atom which comprises continuously introducing at least one halogen with an atomic number between 17 and 35 into a reaction zone containing the said phthalocyanine and a diluent selected from the group consisting of titanium tetrachloride, silicon tetrachloride and tin tetrachloride at a temperature of 120° C. to 250° C. and a pressure of at least two atmospheres, separating the hydrogen halide gas formed in the ensuing reaction from the gaseous diluent by a reflux condenser and removing the gaseous hydrogen halide.

References Cited by the Examiner

UNITED STATES PATENTS

| | | | |
|---|---|---|---|
| 2,208,624 | 7/1940 | Braun | 260—314.5 |
| 2,253,560 | 8/1941 | Detrick et al. | 260—314.5 |
| 2,276,860 | 3/1942 | Niemann et al. | 260—314.5 |

FOREIGN PATENTS 474,740  11/1937  Great Britain.

OTHER REFERENCES

Badger: "The Structures and Reactions of the Aromatic compounds," Cambridge Univ. Press (1954), page 257.

Barrett et al.: "Jour. Chem. Soc." (1936), page 1736.

Olah: Friedel—Crafts and Related Reactions, Interscience, New York (1963), vol. I, pages 34, 256, 257.

Sabatier: Catalysis in Organic Chemistry, Van Nostrand Co., New York (1922), pages 104, 106 and 107.

WALTER A. MODANCE, *Primary Examiner.*

JAMES A. PATTEN, *Assistant Examiner.*